US005456145A

United States Patent [19]

Cosenza

[11] Patent Number: 5,456,145

[45] Date of Patent: Oct. 10, 1995

[54] INSTALLATION TOOL FOR TANGLESS HELICALLY COILED INSERT

[75] Inventor: Frank J. Cosenza, Santa Barbara, Calif.

[73] Assignee: Kato Spring Works Company, Ltd., Tokyo, Japan

[21] Appl. No.: 17,882

[22] Filed: Feb. 16, 1993

[51] Int. Cl.[6] .......... B23P 19/04

[52] U.S. Cl. .......... 81/448; 81/443; 81/459; 29/240.5

[58] Field of Search .......... 81/440–451, 459; 29/240.5

[56] References Cited

U.S. PATENT DOCUMENTS 4,553,302 11/1985 Cosenza et al. .......... 81/443 X

*Primary Examiner*—D. S. Meislin

*Attorney, Agent, or Firm*—Irving Keschner

[57] ABSTRACT

An insertion tool for a helically coiled wire insert of the type used for tapped holes in parent material that is generally softer than a fastener being screwed into the tapped hole, whereby a mandrel having a threaded lead portion and a pivotal pawl inserted in a groove below the threaded portion so that the pawl engages a cut out portion formed in the insert in order that the insert may be screwed onto the tapped hole. The driving face of the pivotal pawl has a cavity formed therein to capture the lead coil of the insert and prevent its axial movement during installation.

11 Claims, 5 Drawing Sheets

INSTALLATION TOOL FOR TANGLESS HELICALLY COILED INSERT

BACKGROUND OF THE INVENTION

1. Field of the Invention

The present invention relates to installation tools for tangless wire formed inserts and, in particular, to an improved installation tool wherein the driving face of the insert engaging pawl member is modified to prevent the insert from moving axially in a direction away from the parent material during installation.

2. Description of the Prior Art

U.S. Pat. No. 4,528,737 and 4,553,302 describe tools for installing tangless wire formed inserts in holes formed in a parent material. The tool utilizes a pivotable pawl to engage a recess in the insert so that the insert may be screwed into the tapped hole.

A problem arises when the individual coils of the tangless wire formed inserts have a minimal cross section area so that the reliability of repeated successful installation is affected. On certain sizes the relationship of the thread pitches, internally and externally, and outside diameter often causes difficulty during the installation phase of the insert. Because of the reduction of the coil cross sectional area, increased flexibility of the lead entry coil may prevent it from aligning with the mating thread in the parent material. As the tool and the insert approach the installation hole, the insert is rotating to engage the lead mating thread. If the lead thread of the rotating insert engages the female thread in the parent material a short distance from the entrance, proper mating will take place and the installation cycle would then be normal. However, when this same rotating insert engages the first thread in the parent material a long distance from the entrance, the insert continues to rotate, its lead coil searching for the entrance thread as a downward pressure is simultaneously occurring. This downward pressure forces the lead coil on the insert to push back axially on the tool and then expand radially. The radial expansion occurs due to the flexibility of the lead entry coil as noted above, and does not allow installation because the major diameter of the insert has now expanded larger than the major diameter of the thread in the parent material. It then becomes impossible for the insert to have any chance to be installed. When this occurs the installation tool has to be stopped from rotation, reversed axially in direction and the insert removed and replaced with a new one.

What is thus desired is to provide an installation tool which prevents the axial movement of the insert lead coil when it abuts against the initial female thread in the parent material to allow installation of inserts having coils of minimal cross-sectional area.

SUMMARY OF THE PRESENT INVENTION

The present invention provides a means for preventing the axial movement of the lead coil of a tangless helical coil insert when it abuts against the first female thread in the parent material. By preventing axial movement, placement of the insert lead coil does not impact the installation process. In particular, whether initial engagement of the insert lead coil is just before the entrance thread of the parent material or 359 degrees away, installation will still be completed.

This is accomplished by forming a cavity or depression on the face of the pawl that engages the tang cutout of the insert. The depression has a shape that is similar to the crossection of the engagement area of the insert and captures the lead coil and prevents axial movement of the insert. As the tool rotates and downward pressure occurs, the lead coil is held in its proper axial position until it rotates into the entrance thread of the parent material. The preferred embodiment has a cavity that resembles very closely the crossection of the insert. For cost reasons, the cavity may be modified slightly to only have one half of the crossection in the face of the pawl. The area away from the work surface is only necessary to prevent the lead coil from its axial movement. In the other direction, the lead thread in the parent material prevents movement of the lead coil toward the parent material.

The present invention thus provides a technique for improving prior art installation tools in a simplified and cost effective manner by modifying the pawl driving face, the simple modification enabling tangless helical inserts of various cross-sectional areas to be installed successfully.

DESCRIPTION OF THE DRAWING

For a better understanding of the invention as well as other objects and further features thereof, reference is made to the following description which is to be read in conjunction with the accompanying drawing wherein.

DESCRIPTION OF THE INVENTION

The present invention is particularly adapted for use with tangless wire inserts, or coils, which are used, for example, where a steel alloyed bolt having conventional threads is desired to be fastened into a material of relatively softer alloy, such as aluminum.

Figure 1:
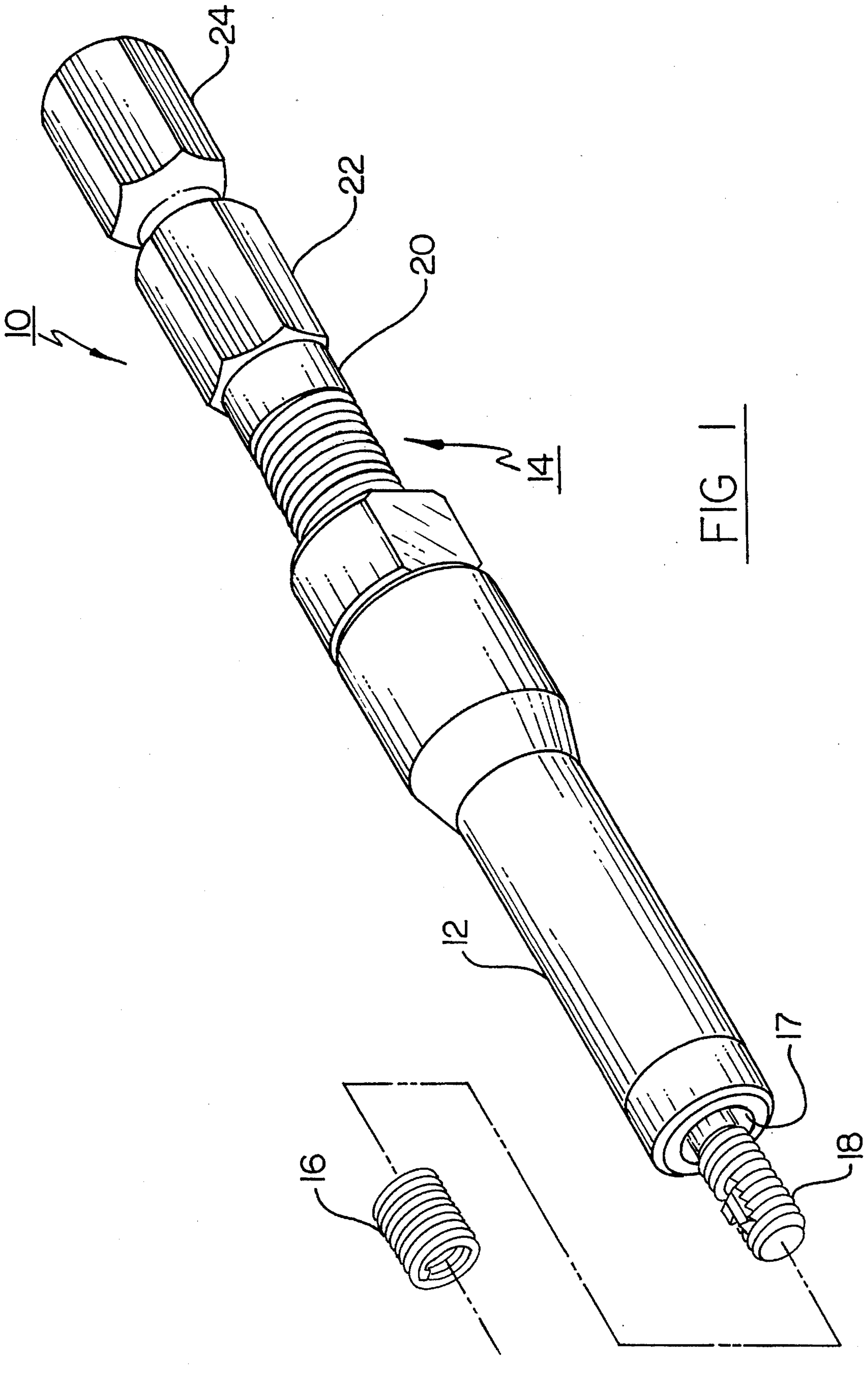
FIG. 1 is a perspective view of a tangless helically coiled insert installation tool in accordance with the teachings of the present invention.

As illustrated in FIG. 1, the installation of tool 10 of the present invention is comprised of two major portions; a tubular body member 12, and a mandrel assembly 14 insertable into the tubular body and adapted to receive a tangless insert 16 which is to be threaded into a tapped hole. The tubular body member 12 provides, in part, the operator with a means for supporting the mandrel assembly 14 in order to install the insert correctly during operation. The tubular body member 12 includes an opening 17, through which extends the lead end 18 of mandrel 14 for receiving insert 16 for installing the coil for smooth transition into the tapped hole.

Figure 2:
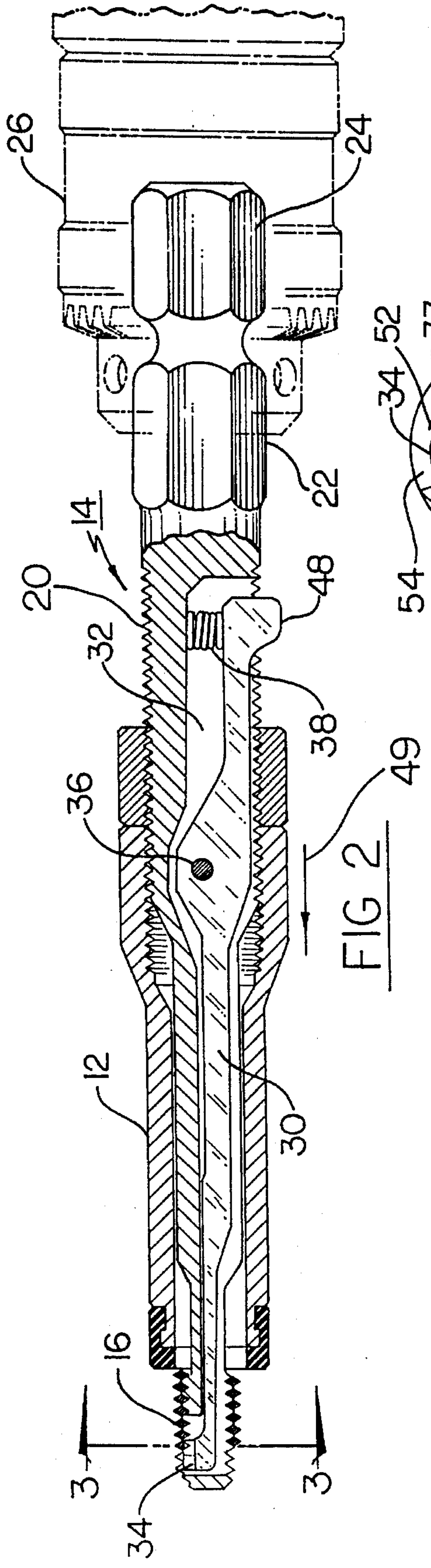
FIG. 2 is a sectional view of FIG. 1 after the helical coil insert is inserted into the coil alignment portion of the prewinder and after the pawl is pivoted outwardly, the driver portion of the tool also being illustrated.
Figure 4:
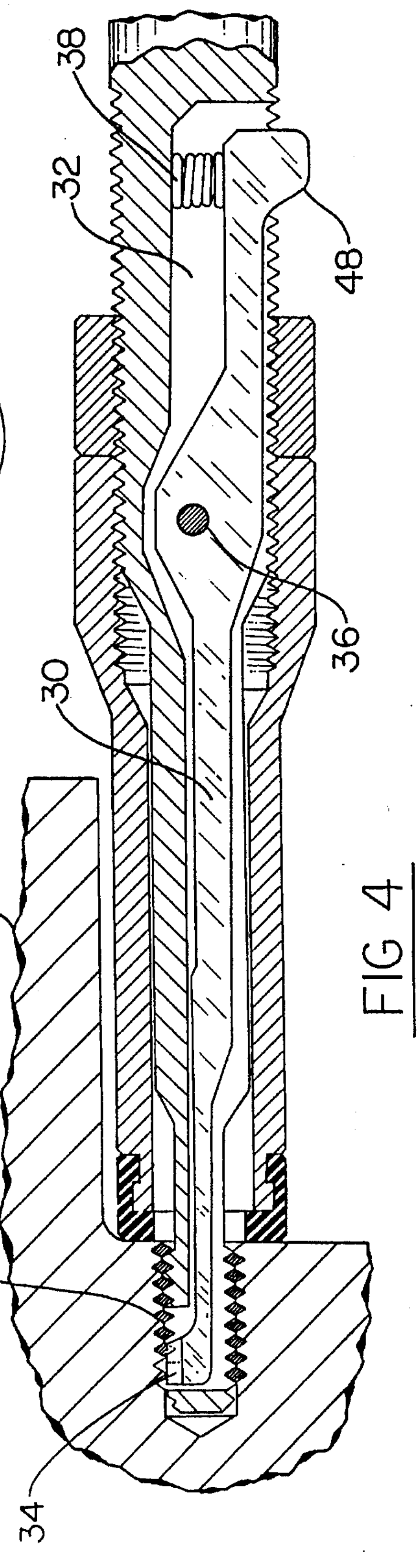
FIG. 4 is a sectional view, similar to FIG. 2, showing the insert installed into a tapped hole.

The mandrel assembly 14 as shown in FIGS. 2 and 4 comprises a threaded cylindrical rod 20 of a diameter substantially equal to the inner diameter of the tubular body member 12. The lead end 18 of the rod 20 is threaded and has a diameter according to the inner diameter of insert 16 prior to installation. This means the diameter of lead end 18 is somewhat smaller than the inner coil diameter of insert 16. At the end opposite the lead end 18 is wrenching shaped torquing surfaces 22 and 24 for receiving a driver 26 (FIG. 2) for applying torque for installing the insert into a tapped hole.

Figure 3:
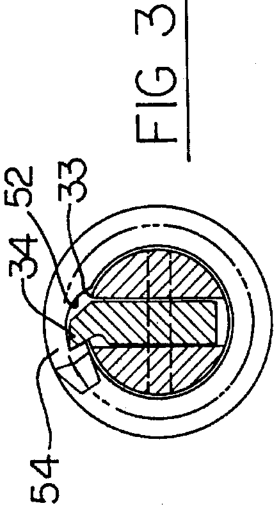
FIG. 3 is a sectional view, with some details omitted, along lines 3—3 of FIG. 1.

In FIGS. 2 and 4, a pivotable catch or pawl 30, is illustrated in an elevation sectional view within a longitudinal cutout 32 of mandrel assembly 14. The pawl 30 is biased within the cutout 32 so that a hook portion 34 (FIG. 3) protrudes through aperture 33 and engages the recess 52 of the tangless wire coil insert 16. The pawl is generally biased about pivot point 36 by spring 38 to locate the hook portion 34 into the recess 52 of the insert when the insert is screwed onto the lead end 18 of the mandrel assembly 14 and the mandrel assembly 14 is axially moved in the tubular body 12. When the extension 48 of pawl 30 enters a hole formed in the surface of mandrel 14 as the mandrel moves in the direction of arrow 49, pawl 30 pivots about point 36 and hook portion 34 enters insert recess 52.

Notch 60 (FIG. 5) is rearwardly adjacent the hook portion 34 and functions to capture the inner thread of the next adjacent thread to the lead thread of the insert to prevent the recess 52 of the insert from slipping off the hook portion 34 when rearward axial force is applied to insert.

Figure 5:
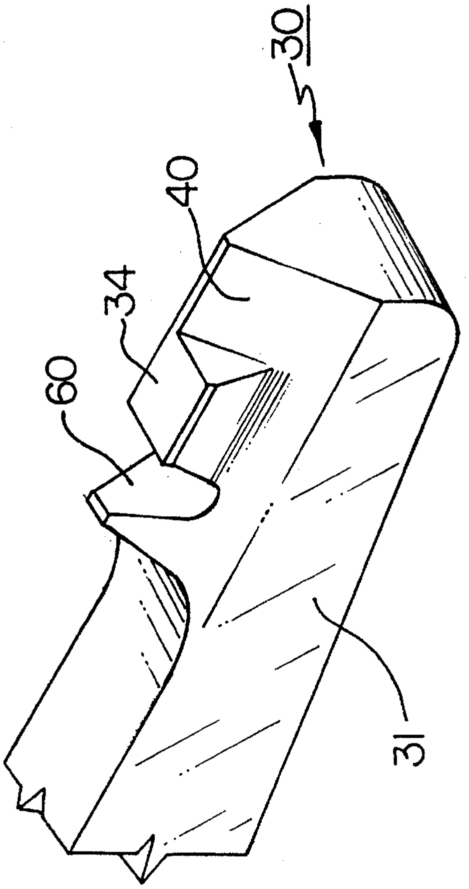
FIG. 5 is a perspective view of the face of a prior art pawl.

As illustrated in FIGS. 4 and 5, the hook portion 34 of the pawl 30, having face portion 31, engages the recess 52 of the lead end of insert 16 in order that the insert may be screwed by means of the tool 10 into a tapped hole. Since both free ends of the helical coiled insert have recesses 52 cut therein, the insert may be positioned in the tool in either direction, thus eliminating the possibility of the operator positioning an insert on the tool in the wrong direction.

Although notch 60 is provided to prevent recess 52 of the insert from slipping off the hook portion 34 when rearward axial force is applied to the insert, it operates by capturing the thread adjacent the lead thread of the insert. However, this in itself will not prevent the lead thread of the insert from slipping off hook portion 34 under certain conditions.

The description of the tangless wire insert installation tool set forth hereinabove provides the background for an understanding of the present invention.

In particular, a problem arises when the individual coils of the insert has a minimal cross-sectional area. Because of the reduction of the coil cross-sectional area, increased flexibility of the lead entry coil may prevent it from aligning with the mating thread in the parent material. As the tool and the insert approach the installation hole, the insert is rotating to engage the lead mating thread. If the lead thread of the rotating insert engages the female thread in the parent material a short rotational distance from the entrance, proper mating will take place and the installation cycle would then be normal. However, when this same rotating insert engages the first thread in the parent material a long rotational distance from the entrance, the insert continues to rotate, its lead coil searching for the entrance thread as a downward pressure is simultaneously occurring. This downward pressure forces the lead coil on the insert to push back axially on the tool such that the lead thread of the insert slips off the hook portion 34 of the pawl 30 and moves axially, allowing the insert coils to expand radially. The radial expansion occurs due to the flexibility of the lead entry coil, and does not allow installation because the major diameter of the insert has now expanded larger than the major diameter of the thread in the parent material. When this occurs, the installation tool has to be stopped from rotation, reversed axially in direction and the insert removed and replaced with a new one. The notch 60 on pawl 30 is ineffective in preventing the axial movement that occurs because of the increased flexibility of the lead coil.

In accordance with the teachings of the present invention, the pawl hook face is modified to prevent the lead coil from axially moving to the extent to allow the lead coil to expand radially, allowing installation to be completed whether initial engagement of the insert lead coil is just before the entrance thread of the parent material or 359 degrees away.

Figure 6A:
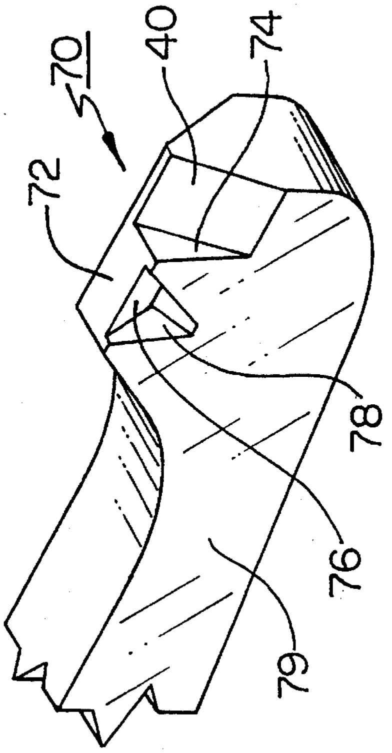
FIG. 6(A) is a perspective view of a first embodiment of a pawl face constructed in accordance with the teachings of the present invention and FIG. 6(B) is a front electional view thereof.
Figure 6B:
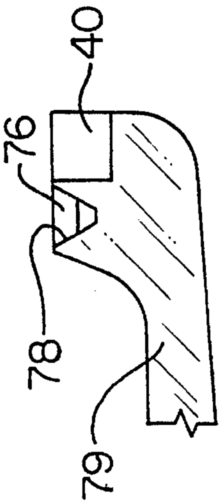

Referring now to FIGS. 6(A) and 6(B), a pawl 70 having a face modified in accordance with a preferred embodiment of the invention is illustrated. It should first be noted that the same reference numerals utilized in the figures identify identical components. In this embodiment, the hook portion 72 of pawl 70 has an angular edge portion 74 extending the length of ramp 40 and a shaped cavity, or recess, portion 76. Cavity 76 has a force bearing, insert contacting surface 78 extending inwardly from and substantially perpendicular to face portion 79, and extending at an angle inwardly from the top to the bottom thereof, and is thus shaped to conform substantially to the diamond cross-sectional shape of the recess portion 52 of lead end 54 of insert 16 contacted by hook 34. In addition, the depth of cavity 76 is selected such that insert 16 is maintained within the cavity and in contact with the surface 78 during installation, both features insuring that the insert axial motion described hereinabove is prevented, enabling the minimum cross-sectional area insert to be properly installed.

Figure 7A:
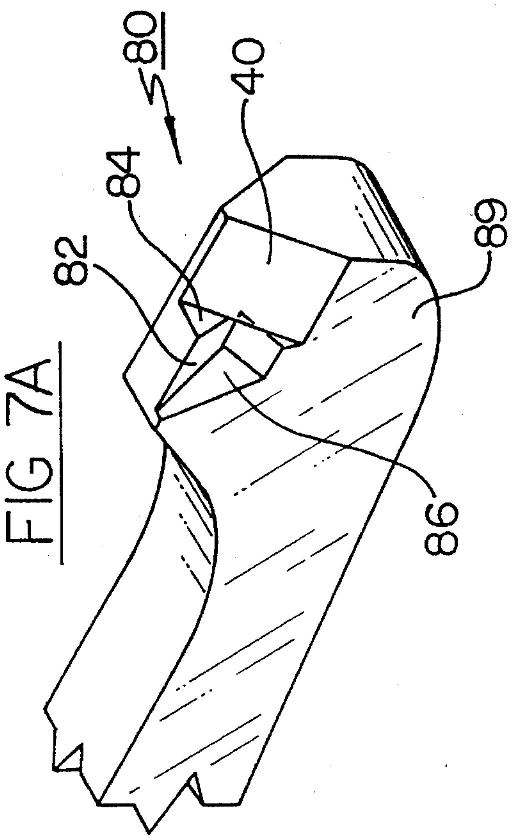
FIG. 7(A) is a perspective view of a first embodiment of a pawl face constructed in accordance with the teachings of the present invention and FIG. 7(B) is a front electional view thereof.
Figure 7B:
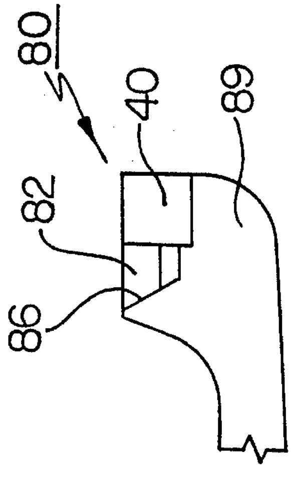

FIGS. 7(A) and 7(B) describe an alternative embodiment of the pawl face in accordance with the teachings of the present invention. In particular, pawl face 80 has a cavity 82 with an angular edge 84 extending along a portion of the surface of ramp 40. Surface 84 in this embodiment is vertically shaped and, as noted hereinabove, extends a shorter distance than the corresponding surface shown in the FIG. 6 embodiment. However, the depth of cavity 82 and the force receiving, or insert contacting, surface 86 function similarly to the embodiment shown in FIGS. 6A and 6B, the removal of the portion of the cavity portion closest to the pawl end reducing the manufacturing cost in comparison to the FIG. 6 embodiment. Insert contacting surface 86 extends inwardly from and substantially perpendicular to face portion 89 and at an angle inwardly from the top to the bottom thereof, thus surface 86 conforming to a portion of the cross-sectional shape of lead end 54 of insert 16. The depth of cavity 82 is selected in the same manner as that for the embodiment shown in FIGS. 6A and 6B.

Figure 8A:
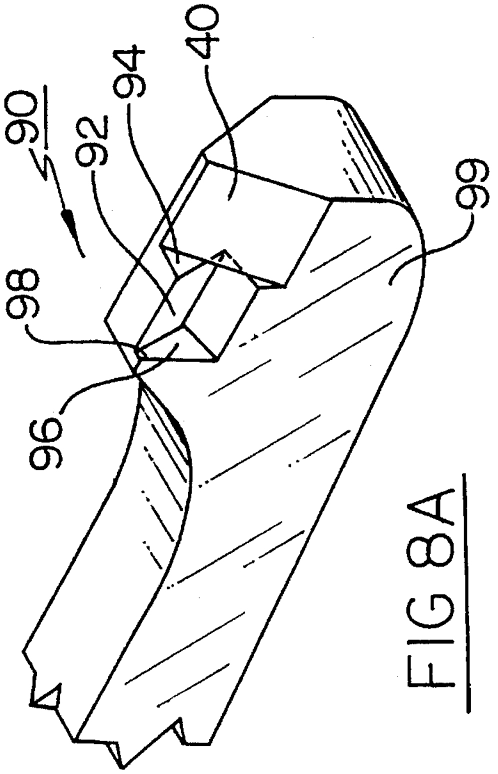
FIG. 8(A) is a perspective view of a third embodiment of a pawl face constructed in accordance with the teachings of the present invention and FIG. 8(B) is a front electional view thereof.
Figure 8B:
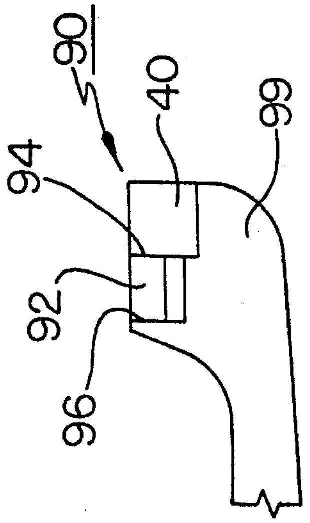

FIGS. 8(A) and 8(B) describe an alternative embodiment of the pawl face in accordance with the teachings of the present invention, the function thereof being identical to that shown in the FIG. 6 and 7 embodiments. In particular, pawl face 90 has a cavity 92 with an angular edge 94 extending along a portion of the surface of ramp 40. Surface 94 in this embodiment is similar to surface 84 in the FIG. 7 embodiment. The depth of cavity 92 is sufficient to receive the cutout portion on insert 16. The force receiving surface 96 in this embodiment is normal to the axial direction of the insert 16 (perpendicular to face portion 99) as illustrated in FIG. 8B and does not extend inwardly at an angle from the top to bottom of cavity 92, the surface of insert 16 thus not contacting the entire surface 96, but only along a longitudinal linear contact area 98. This embodiment, although less complex to manufacture than the versions shown in FIGS. 6 and 7, is less capable of ensuring that the insert is maintained in cavity 92 due to the smaller contact area since the shape of the cavity, particularly surface 96, does not conform to the shape of the contacted recess portion 52 of lead end 54 of insert 16 although the depth thereof is selected similarly to the embodiments set forth hereinabove.

In essence, as the lead thread tries to engage the female starting point, each of the cavities shown in the different embodiments prevent the lead coil from moving axially. That is, the downward pressure of the tool will continue as will the rotation, but the downward movement will stop until the lead insert thread rotates into the proper engagement position. There is a small chamfer at the entrance of the female thread in the parent material (not illustrated) . This chamfer is generally between 90° and 120° and facilitates engagement of the insert. Thus when the lead thread of the insert is rotationally 359° or less away from the entrance point, a resultant load is imposed on the insert to force the lead thread of the insert inward and axially upward. Cutout, or cavities 76, 82 and 92, however, prevents this action from occurring.

Figure 9:
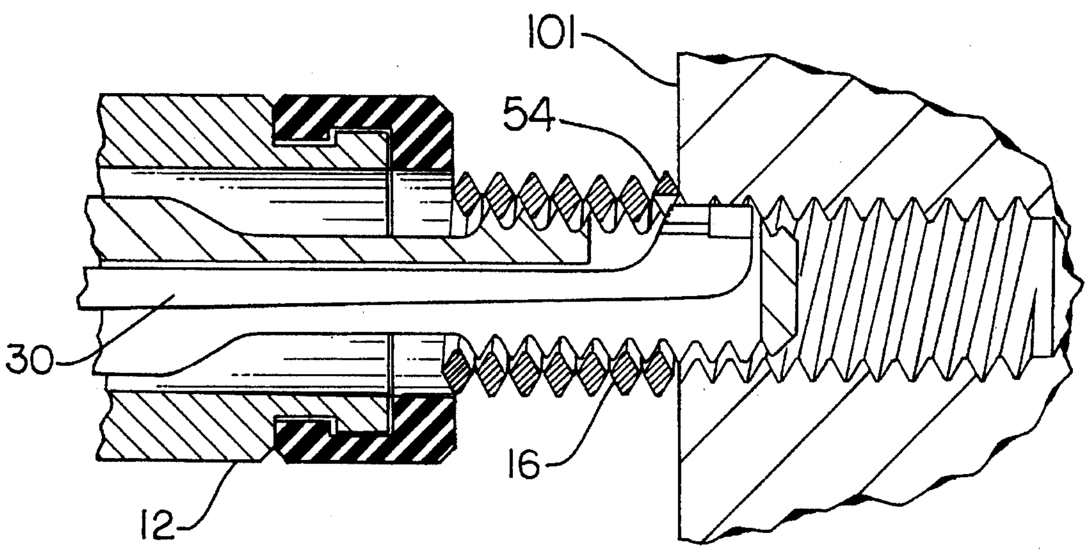
FIG. 9 is a view illustrating how an insert would expand radially and not engage the threaded hole in the parent material if prior art pawl faces were utilized in the installation tool.

FIG. 9 illustrates, in a simplified manner, how a prior art pawl face, similar to the one shown in FIGS. 4 and 5, could prevent proper installation of the insert 16. As illustrated, due to the flexible nature of the material comprising the insert, the lead coil 54 of the insert is expanded radially and is prevented from entering the tapped hole in parent material 101.

Figure 10:
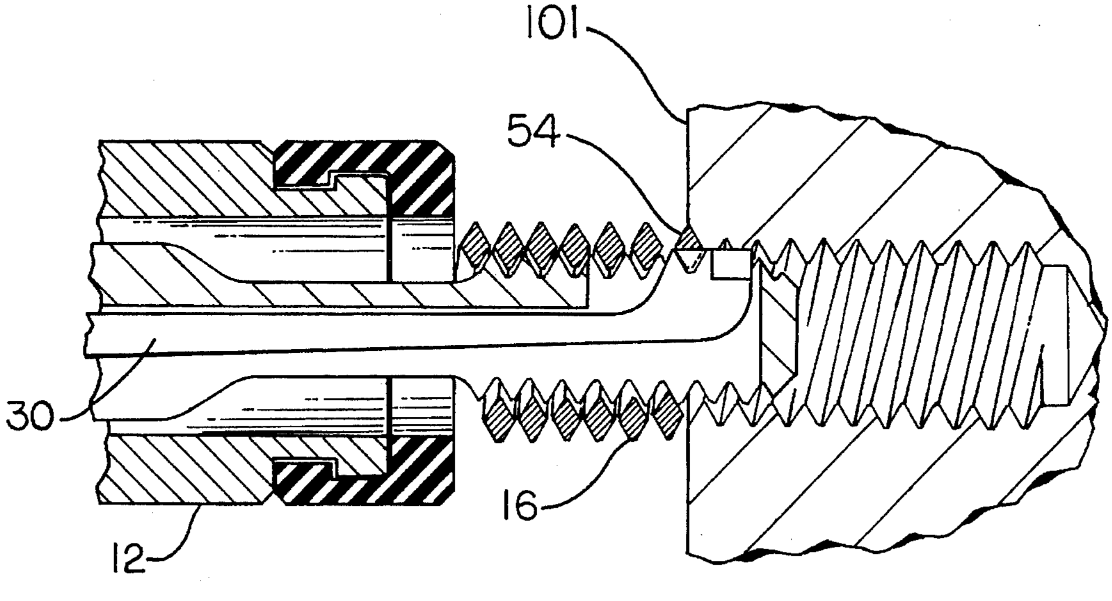
FIG. 10 illustrates how a tangless insert is maintained in engagement with the threaded hole in the parent material utilizing an installation tool having pawl faces constructed in accordance with the teachings of the present invention.

FIG. 10 illustrates how a pawl face, modified in accordance with the teachings of the present invention, captures the lead coil 54 securely, preventing the radial expansion of the coil and enabling the insert to be threaded into the tapped hole in parent material 101.

The present invention thus provides an installation tool wherein the insert engagement mechanism captures the lead coil of a flexible tangless insert and prevents axial movement during installation, allowing the insert to be properly installed rapidly in a cost efficient manner.

While the invention has been described with reference to its preferred embodiments, it will be understood by those skilled in the art that various changes may be made and equivalents may be substituted for elements thereof without departure from the true spirit and scope of the invention. In addition, many modifications may be made to adapt a particular situation or material to the teachings of the invention without departing from its essential teachings.

What is claimed is:

1. A tool for inserting a tangless helically coiled insert in a tapped hole, the tangless helically coiled insert having at least one free end and a recess formed therein comprising:

a tubular body of substantially circular cross-section, said body including a portion at one end thereof having an aperture therein adapted to receive a tangless helically coiled insert;

a mandrel insertable into said tubular body and adapted to receive the tangless insert for installation in the tapped hole, said mandrel having a portion with a cavity therein;

driving means at one end of said mandrel for applying a torque sufficient to install the tangless insert in a tapped hole, said mandrel having a threaded portion at an end opposite said driving means and adjacent said body aperture for threading the tangless helically coiled inserts thereupon, and means for engaging said mandrel with said tangless insert for simultaneous movement of said mandrel and said tangless insert, said engaging means comprising a pivotable pawl having a laterally projecting hook means biased in a first direction and extending longitudinally in said mandrel cavity adjacent said mandrel threaded portion, said hook means having a laterally projecting face portion thereon which contacts said tangless insert at the insert recess as said mandrel is rotated in a first direction, said face portion having a cavity formed thereon to receive the lead coil of the insert, said cavity having a force bearing surface which contacts said lead coil, said force bearing surface preventing axial movement of the insert during installation and thus preventing said lead coil from expanding whereby the insert cannot be inserted into said tapped hole.

2. The tool of claim 1 wherein the depth of said cavity is selected such that the contacting insert coil end is retained in the cavity during installation.

3. The tool of claim 2 wherein said cavity has a shape that substantially corresponds to the shape of the portion of the insert lead coil that is received therein.

4. The tool of claim 3 wherein said force bearing surface contacts substantially all of the adjacent surface area of said insert during installation.

5. The tool of claim 3 where said force bearing surface contacts only a small portion of the adjacent surface area of said insert during installation.

6. A tool for inserting a tangless helically coiled insert in a tapped hole, the tangless helically coiled insert having at least one free end and a recess formed therein comprising:

a tubular body of substantially circular cross-section, said body including a portion at one end thereof having an aperture therein adapted to receive a tangless helically coiled insert;

a mandrel insertable into said tubular body and adapted to receive the tangless insert for installation in the tapped hole, said mandrel having a portion with a cavity therein;

driving means at one end of said mandrel for applying a torque sufficient to install the tangless insert in a tapped hole; said mandrel having a portion at an end opposite said driving means and adjacent said body aperture for threading the tangless helically coiled inserts thereupon, and means for engaging said mandrel with said tangless insert for simultaneous movement of said mandrel and said tangless insert, said engaging means comprising a pivotable pawl having a laterally projecting hook means biased in a first direction and extending longitudinally in said mandrel cavity adjacent said mandrel threaded portion, said hook means having a laterally projecting face portion thereon which contacts said tangless insert recess as said mandrel is rotated in a first direction, said face portion having a cavity formed thereon to capture a portion of the lead coil of the insert to prevent axial movement of the insert during installation, said cavity having at least one surface extending inwardly from and substantially perpendicular to said face portion, said inwardly extending surface being in engagement with the captured portion of said coil during installation.

7. The tool of claim 6 wherein the depth of said cavity is selected such that the contacting insert coil end is retained in the cavity during installation.

8. The tool of claim 7 wherein said cavity has a shape that substantially corresponds to the shape of the portion of the insert lead coil that is received therein.

9. The tool of claim 8 wherein said inwardly extending surface contacts substantially all of the adjacent surface of the insert captured within said cavity.

10. The tool of claim 8 wherein said inwardly extending surface contacts a small area of the adjacent surface of the insert captured within said cavity.

11. The tool of claim 8 wherein said inwardly extending surface extends at an angle inwardly from the top to the bottom of the cavity.

* * * * *